(12) United States Patent
Krishnaswamy

(10) Patent No.: US 9,521,621 B2
(45) Date of Patent: Dec. 13, 2016

(54) APPLICATION-PROXY SUPPORT OVER A WIRELESS LINK

(75) Inventor: Dilip Krishnaswamy, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 581 days.

(21) Appl. No.: 12/792,433

(22) Filed: Jun. 2, 2010

(65) Prior Publication Data

US 2011/0299454 A1    Dec. 8, 2011

(51) Int. Cl.
*H04W 52/02* (2009.01)
*H04L 29/08* (2006.01)
(Continued)

(52) U.S. Cl.
CPC ...... *H04W 52/0229* (2013.01); *H04L 67/1095* (2013.01); *H04L 67/2819* (2013.01); *H04L 67/2833* (2013.01); *H04L 67/2861* (2013.01); *H04W 76/046* (2013.01); *H04W 88/182* (2013.01); *Y02B 60/41* (2013.01); *Y02B 60/50* (2013.01)

(58) Field of Classification Search
CPC ........... H04W 52/0229; H04W 76/046; H04W 88/192; H04L 67/1095; H04L 67/2819; H04L 67/2833; H04L 67/2861; Y02B 60/41; Y02B 60/50
USPC ......................................................... 370/328
See application file for complete search history.

(56) References Cited

U.S. PATENT DOCUMENTS

2002/0172190 A1* 11/2002 Vatanen .................... 370/352
2003/0036354 A1*  2/2003 Lee et al. ................... 455/41
(Continued)

FOREIGN PATENT DOCUMENTS

CN     101217508 A    7/2008
EP       1962473 A1   8/2008
(Continued)

OTHER PUBLICATIONS

Balani, Rahul. "Energy Consumption Analysis for Bluetooth, WiFi, and Cellular Networks" University of California Los Angeles. Dec. 2007.*

(Continued)

*Primary Examiner* — Stephen J Clawson
(74) *Attorney, Agent, or Firm* — Nerrie M. Zohn

(57) ABSTRACT

Application proxy support over a wireless link between a mobile device and a wireless node is disclosed. Application proxy support is configured to conserve energy and resources and is configured to mitigate delays in a communication environment. Application proxy support can be associated with a wireless node, such as a femto cell, which can provide a coarse-grain wireless application proxy support that can utilize various criteria to buffer data and determine how long to delay delivery of data. Femto cell can provide a fine-grain wireless application proxy that runs application proxies for each mobile device for one or more applications associated with mobile device. The proxy can determine whether to buffer and forward received data to mobile device. The wireless application proxy can respond to network on behalf of mobile device. The proxy can wake up mobile device upon arrival of a significant event associated with a proxied application.

40 Claims, 11 Drawing Sheets

(51) Int. Cl.
  *H04W 76/04* (2009.01)
  *H04W 88/18* (2009.01)

(56) References Cited

U.S. PATENT DOCUMENTS

| | | | |
|---|---|---|---|
| 2004/0128310 A1* | 7/2004 | Zmudzinski et al. | 707/102 |
| 2005/0054389 A1* | 3/2005 | Lee et al. | 455/574 |
| 2007/0124386 A1 | 5/2007 | Klassen | |
| 2008/0225760 A1 | 9/2008 | Iyer et al. | |
| 2009/0258672 A1 | 10/2009 | Camp, Jr. et al. | |
| 2010/0042856 A1 | 2/2010 | Tsai et al. | |
| 2010/0128709 A1 | 5/2010 | Liu et al. | |

FOREIGN PATENT DOCUMENTS

| | | |
|---|---|---|
| EP | 2154922 A1 | 2/2010 |
| JP | 2001274858 A | 10/2001 |
| JP | 2007081519 A | 3/2007 |
| JP | 2009500891 A | 1/2009 |
| JP | 2010044732 A | 2/2010 |
| JP | 2010521129 A | 6/2010 |
| KR | 20100020410 A | 2/2010 |
| WO | WO-2005072484 A2 | 8/2005 |
| WO | WO2005072494 A2 | 8/2005 |
| WO | 2007000658 A2 | 1/2007 |
| WO | 2008115813 A1 | 9/2008 |
| WO | WO2010039022 A2 | 4/2010 |
| WO | WO2010078364 A1 | 7/2010 |

OTHER PUBLICATIONS

International Search Report and Written Opinion—PCT/US2011/038876, International Search Authority—European Patent Office—Aug. 23, 2011.

Agarwal, et al. "Somniloquy: Augmenting Network Interfaces to Reduce PC Energy Usage." Proceedings of the 6th USENIX Symposium on Networked Systems Design and Implementation, Apr. 22, 2009. Boston, Mass. 16 pages.

* cited by examiner

APPLICATION-PROXY SUPPORT OVER A WIRELESS LINK

BACKGROUND

Field

The following description relates generally to wireless communications and more particularly to communication environments that utilize application proxy support.

Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking) These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Recently, users have started to replace fixed line communications with mobile communications and have increasingly demanded improved voice quality, reliable service, and efficient devices. In addition to mobile phone networks currently in place, a new class of small base stations has emerged, which may be installed in a user's home or other area and which provide indoor wireless coverage to mobile units using existing broadband Internet connections. Such personal miniature base stations are generally known as access point base stations, or, alternatively, Home Node B (HNB), or femto cells. Typically, such miniature base stations are connected to the Internet and the mobile operator's network through a Digital Subscriber Line (DSL) router or a cable modem.

Femto cells transmit a small amount of power and have a much smaller coverage area as compared to macro cells, which have large coverage areas. Femto cells are added in a network to provide coverage where there might be a void in the macro cell coverage and/or where extra capacity is desired. This new type of network deployment topology that includes a mixture of macro cells and femto cells is becoming more common.

With the widespread use of wireless communication networks, the efficiency of mobile devices and conservation of power (or battery life) can be a concern to device users. Generally, a mobile device not in active use is in a sleep mode and has to wake-up, at least periodically, to determine whether there is an incoming communication. If there is no incoming communication, the mobile device can return to sleep mode. Additionally, after completion of a communication, the device may enter a lower-power mode in an attempt to conserve energy. The transitions from/to sleep mode and between other modes can needlessly consume power and introduce delays.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enhancing a network state to be aware of sideband data paths available and the choices the sidebands provide. A proxy and mobile device can configure which sideband to use as a function of the bandwidth needed for data and/or applications and/or a delay tolerance of the data and/or applications. In accordance with some aspects, the sideband to use is determined based on a classification of data. The classification can also indicate a delay tolerance and a sideband that should be utilized. The classification can also include information related to a length of time mobile device should be in a sleep mode.

An aspect relates to a method used in a communications environment at a wireless node. Method comprises supporting communications for a mobile device with a wireless wide area network. Method also comprises providing applications proxy support at the wireless node for a subset of applications associated with the mobile device. The wireless node is accessible to the mobile deice over a first wireless link.

An aspect relates to a communications apparatus that comprises a memory and a processor. Memory retains instructions related to supporting communications for a mobile device with a wireless wide area network. Memory retains further instructions related to providing application proxy support at the communications apparatus for a subset of applications associated with the mobile device. Communications apparatus is accessible to mobile device over a first wireless link. Processor is coupled to memory and is configured to execute instructions retained in memory.

An aspect relates to a communications apparatus that provides proxy support for a mobile device. Communications apparatus includes means for supporting communications for the mobile device with a wireless wide area network. Communications apparatus also includes means for providing application proxy support at the communications apparatus for a subset of applications associated with mobile device. In accordance with some aspects, means for providing comprises means for receiving a first subset of data and means for processing the first subset of data. According to some aspects, communications apparatus comprises means for buffering the first subset of data and means for conveying the first subset of data after a configurable delay.

In accordance with some aspects, communications apparatus comprises means for maintaining at least two states, which comprises means for reserving a first state and means for reserving a second state. According to some aspects, communications apparatus comprise means for monitoring availability of second state and means for transitioning the mobile device to the second state.

According to some aspects, communications apparatus includes means for receiving a second subset of data, means for buffering the second subset of data, and means for transmitting the second subset of data. According to some aspects, wireless communications apparatus includes means for identifying active applications on mobile device, means for running an application proxy for one or more active applications to buffer data, and means for delivering buffered data to mobile device based on a configurable delay.

According to an aspect is a computer program product comprising a computer-readable medium. Included in computer-readable medium is a first set of codes for causing a computer to support communications for a mobile device with a wireless wide area network. Computer-readable medium also includes a second set of codes for causing computer to provide application proxy support for a subset of applications associated with mobile device.

An aspect relates to at least one processor configured to provide proxy support for a mobile device. Processor includes a first module that supports communications for the mobile device with a wireless wide area network. Processor also includes a second module that provides application proxy support for a subset of applications associated with the mobile device and a third module that receives from the wireless wide area network a first subset of data intended for the mobile device. Also included in processor is a fourth module that processes the first subset of data.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects.

It may be evident, however, that such aspect(s) may be practiced without these specific details. In other instances, well-known structures and devices are shown in block diagram form in order to facilitate describing these aspects.

Figure 1:
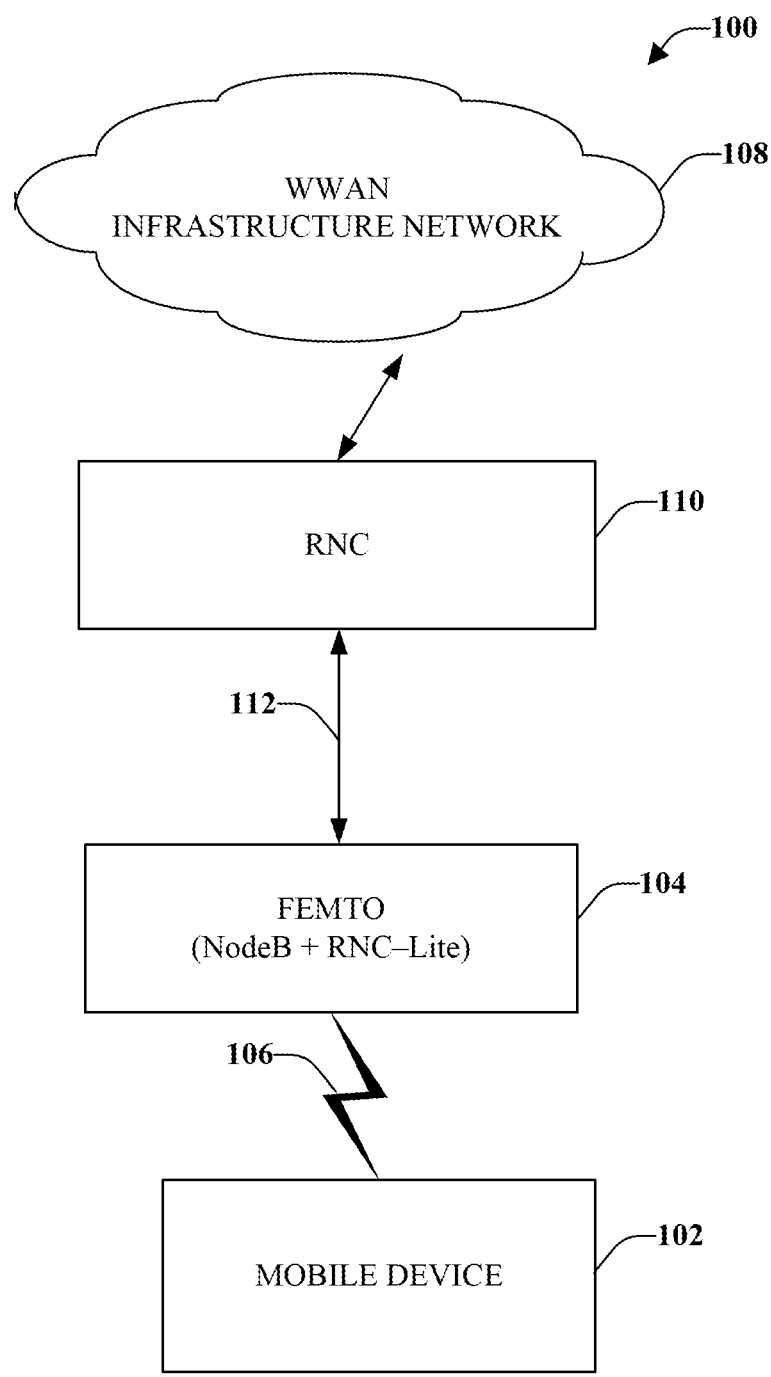
FIG. 1 illustrates a wireless communications environment in which the disclosed aspects can be utilized.

FIG. 1 illustrates a wireless communications environment 100 in which the disclosed aspects can be utilized. Included in wireless communications environment 100 is one or more mobile devices 102 that are in communication with a Home Node B unit or femto cell 104. Mobile device 102 and femto cell 104 can communicate over a wireless link or a wired link, illustrated as a wireless link 106. Femto cells can be installed in a small scale network environment, such as, for example, in one or more user residences or other environments. Femto cells are configured to serve associated, as well as alien, mobile devices (e.g., can be deployed in an unplanned manner). Femto cell 104 is coupled to an infrastructure network (which can be a wireless wide area network (WWAN 108) infrastructure network) though a radio network controller (RNC) 110. Connection between femto cell 104 and RNC 110 can be over a tunnel 112 (e.g., Digital Subscriber Line (DSL)). In accordance with some aspects, tunnel is over a wired communication link.

The disclosed aspects provide optimizations, which can be aggressive optimizations, for real-time application utilizing application proxies at femto cell 104 on behalf of mobile device 102, served by femto cell 104. Mobile device 102 can run many applications (e.g., Phone Applications, Instant Messenger Applications, Email applications, Browser applications, and so on). Phone applications might also process several tasks that do not relate to real data. Instant Messenger Applications should support regular presence updates, user-initiated status updates, and presence probes from remote user Instant Messenger Applications. Keep-alives are maintained to reset "connection state" timers in routers/middleboxes. Voice applications may have constant information exchange with peers regarding availability of peers, without necessarily engaging in a voice call with the peer. In general, mobile device 102 communicates or receives packets without real application traffic. Thus, it is desirable to support an application proxy at the femto cell for real-time offload at the femto cell. This allows mobile device to sleep until there is a real event that user of mobile device needs to process.

In accordance with some aspects, proxy is implemented on a femto cell and managed over a wireless link between mobile device and femto cell. Mobile device configures femto cell with proxy support that mobile device desires and mobile device can go to sleep waiting for a wakeup from femto proxy.

According to some aspects, a packet filtering approach can be used at femto cell to merely filter packets for relevant applications at appropriate port numbers. A more aggressive approach is to provide application stubs on femto cell for Instant Messenger applications, voice, email, and browser applications, in order for these applications stubs to operate on behalf of mobile device and perform a coarse synchronization with the applications environment on mobile device based on an occasional wakeup for synchronization or information. This can mitigate the need for mobile device to wake up frequently and communicate information. Synchronization can also be performed over an alternate low energy link, such as a long range low energy BlueTooth® link, if available and desired. A virtualized implementation on the femto cell can be utilized to support each mobile device proxy in a different virtual partition. Virtualization solutions can be used to provide virtualization support for multiple users.

Figure 2:
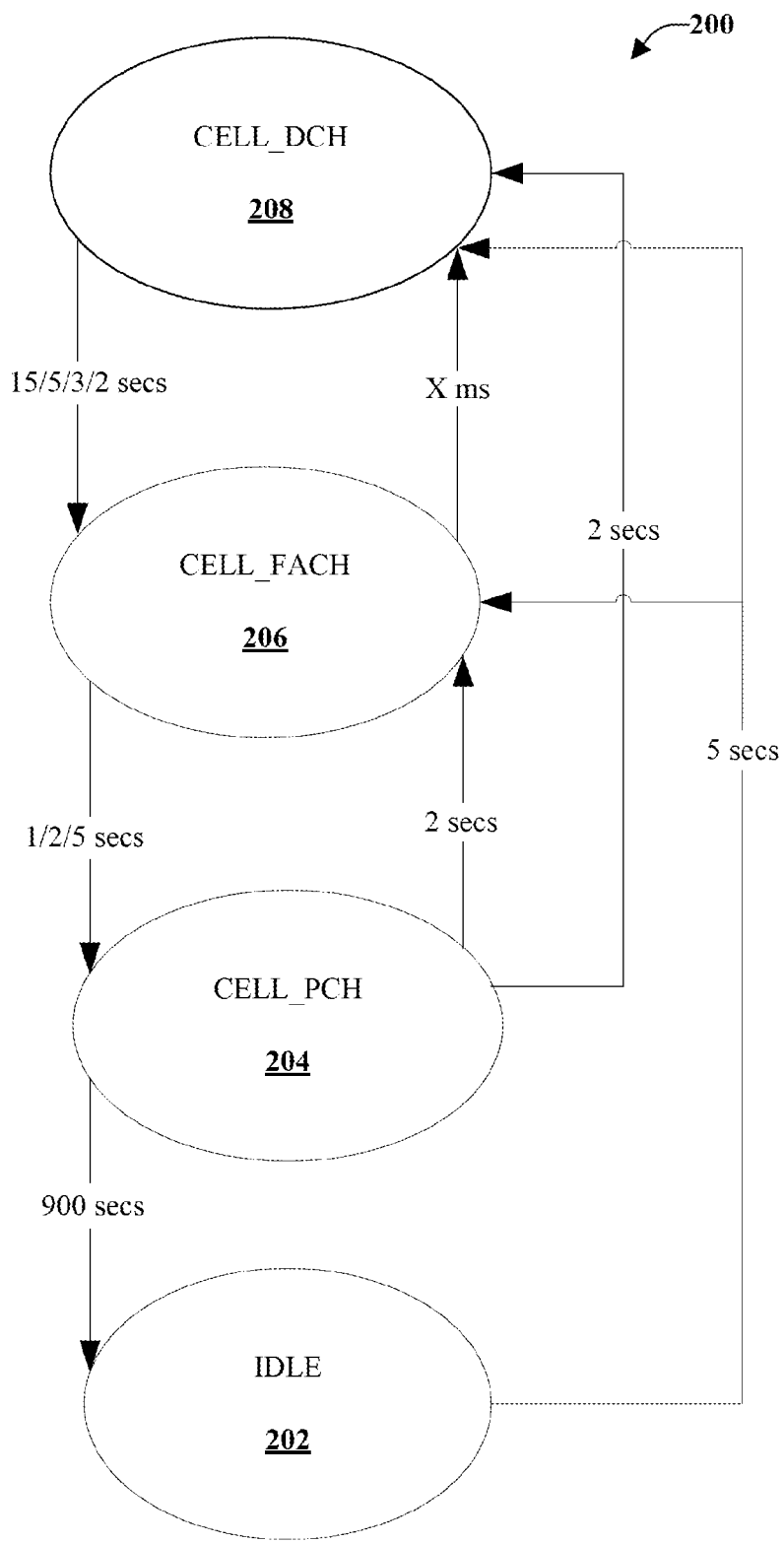
FIG. 2 illustrates a schematic representation of states that a mobile device might be in while communicating with a network.

When mobile device 102 is communicating with WWAN 108, mobile device 102 can be in one of various states associated with a WWAN protocol state. FIG. 2 illustrates a schematic representation of states, which can be WWAN states 200, that a mobile device might be in while communicating with a network (such as a WWAN network). Mobile device can be in idle state 202 while sleeping or while waiting for a communication (e.g., phone call, text message, video, data, and so on). Mobile device might wake up periodically to determine whether there is an incoming communication, and, if there is no incoming communication, mobile device transfers back into idle state 202.

Mobile device can be in Paging Channel (PCH) state or Cell_PCH state 204 when processing a page, for example. Cell_PCH state 204 is a low power mode. There are no physical channels allocated to mobile device in Cell_PCH state 204.

If mobile device is actively communicating (e.g., sending a communication, receiving a communication), mobile device can be in forward access channel (FACH) state or Cell_FACH state 206. In Cell_FACH state 206 (or FACH mode), there is no dedicated physical channel allocated to mobile device. Mobile device is assigned a shared transport channel (e.g., other mobile devices are using the channel) on uplink (e.g., a random access channel (RACH)). Base station uses FACH on downlink (which base station also uses for other mobile devices).

When the channels are RACH and FACH (e.g., shared channel mode), there are no dedicated bearers established (e.g., when there is a small amount of data to be communicated). If there is a large amount of data to be communicated (e.g., streaming video, a large of data to download), mobile device transitions to a dedicated channel (DCH) mode or Cell_DCH State 208 and dedicated bearers are allocated to mobile device on uplink and downlink.

Transferring from one state to another state consumes energy and introduces delay, which can be a function of a delay while waiting for additional traffic. For example, transitioning from idle state 202 to Cell_DCH State 208 can take about five seconds. In another example, a transfer from Cell_PCH state 204 to Cell_FACH state 206 or Cell_DCH State 208 can take around two seconds. In a further example, to transition from Cell_DCH State 208 to another state can take about two seconds through approximately fifteen seconds. Delay time is configurable and can depend on the operator or service provider. It should be noted that delay times described and/or illustrated are for example purposes only.

Due to one or more delays involved, different operators (or service providers) can establish different delay timings for transitioning between states. If the timing is aggressive in order to save energy (e.g., transition to a lower energy mode), it can conserve mobile device energy, however, the user experience can be negatively affected because the user has to wait for transition to a higher power state before network resources become available.

In an example, transition time from Cell_DCH State 208 to Cell_FACH state 206 can be relatively quick (e.g., two seconds). However, at three seconds, just after transition was completed, there is an event that requires a large amount of data to be exchanged. Thus, mobile device needs to transition from Cell_FACH state 206 back to Cell_DCH State 208. In order to make this transition, over FACH and RACH, there is a request for dedicated bearers, which are established before mobile device can transition to Cell_DCH State 208. Only after transition to Cell_DCH State 208 (and associated delay and energy consumption) can mobile device receive/transmit data. Thus, there is a tradeoff between the time/energy consumed while changing modes verses remaining in the same mode (and saving time but consuming more energy relative to transitioning to a lower power mode).

The disclosed aspects utilize the proxy to buffer data and determine how long to delay delivery of data to mobile device. According to an aspect, proxy can be on a femto cell. In accordance with some aspects, there is substantially no delay in delivery of data to mobile device. A delay can be a function of a classification of data. Classification can be included in a header and received with data. In accordance with some aspects, mobile device configures femto cell with classifications (e.g., mobile device communicates desired configurable classifications to proxy). Proxy can manage mobile device state transitions as a function of classification in an attempt to conserve energy of mobile device. According to some aspects, proxy aggregates data having multiple classifications and delivers the aggregated data to mobile device in a burst. After delivering the aggregated data, proxy sends mobile device back to a low energy mode. According to some aspects, secondary WWAN states with a sideband control signaling mechanism can be utilized to help provide energy savings on mobile device.

In accordance with some aspects, a femto cell can run application proxies for each mobile device for at least a subset of applications that are active on each mobile device. Application proxies receive and buffer data from network and deliver data to mobile device as a function of a configurable delay. A higher delay can result in a larger amount of energy savings on mobile device. A shorter delay can result in a smaller amount of energy savings on mobile device.

Examples of energy consumptions costs include energy consumed during transitions and energy consumed while remaining in higher energy states. Energy state transitions (including Cell_DCH to Cell_FACH to Cell_PCH to Idle) consume energy. According to an aspect, energy consumption can be offloaded to proxy (or femto cell). Mobile device may need to be in a higher-energy state (e.g., higher than about 0.09 mA) when faster response is needed. For example, emails can be around two Kbyte and arrive about every five minutes. Internet accesses, such as queries regarding traffic updates or other web access, can be about ten Kbyte access). Keep alives for TCP (e.g., email, web) sessions can be infrequent, such as about every fifteen minutes. Keep alives for UDP sessions (e.g., instant messaging applications) can be more frequent, such as around every forty seconds. Application synchronization (e.g., chat, instant messaging applications) can also consume energy.

In accordance with some aspects, an application proxy on the femto cell can keep-alive messages to the network on behalf of the proxied application associated with the mobile device. The application proxy can also respond to synchronization messages and update messages from the network. An example of a proxied application is an instant messenger application. In this case, the mobile client (e.g., mobile device) can sleep while the application proxy, executing on the femto cell, sends periodic keep-alive messages, receives presence updates from remote peers, provides periodic presence updates on behalf of the mobile client to remote peers, and handles presence probes.

Another example of a proxied application can be a VoIP (Voice Over Internet Protocol) application proxy. The mobile client can be allowed to sleep and wake up periodically to synchronize with latest updated information about VoIP application peers. For example, the VoIP application on the mobile client can synchronize once every minute (or at different times) with its wireless VoIP application proxy on the femto cell. The mobile client can sleep during the sleep interval after the synchronization event with the application proxy and prior to the next synchronization event with the application proxy. During this sleep period, the VoIP proxy can interact with the network on behalf of the VoIP application on the mobile client, receive updates regarding peers of interest, and provide updates to peers, send keep-alive messages, respond to network synchronization requests, and so on. The VoIP proxy can aggregate all updated information to provide a collective update to the mobile client at the next synchronization event with the mobile client. Additionally or optionally, this collective update can include a collective update from other proxied applications such as an instant messenger application. This process can continue until there is a significant event such as incoming voice call. When a significant event occurs, the VoIP application proxy can wake up the mobile client, so that the user of the mobile client can receive the voice call. At such a time, the VoIP application proxy can be made dormant. However, other applications (such as an instant-messenger application or an email application) can continue to be proxied at the femto cell, if desired. Alternatively or additionally, the proxy support for an application can be disabled based on input from the client or based on activity of the user of the mobile client that desires to take an action with regard to a proxied application, such as the user of the mobile client device initiating a voice call, or the user of the mobile client desiring to send an instant message or send an email.

An optional data relay from femto cell can provide additional energy savings using one or more sideband data paths for data delivery. Support can be provided for web, email, and instant messaging applications as well as other applications. Responsibility for WWAN communications can be transferred to proxy (or femto cell). In an example, one of the sidebands can be for BlueTooth®, which might have an active mode current of around 30 mA. Assume WWAN data communications is 150 mA on average and assume X mA for local applications processing on the platform. If data processing time takes T seconds (and assuming WWAN link and BlueTooth® links have similar bandwidth), then relative energy savings can be expressed by ((X+150 mA)−(X+30 mA)) T=120 T mAs.

Figure 3:
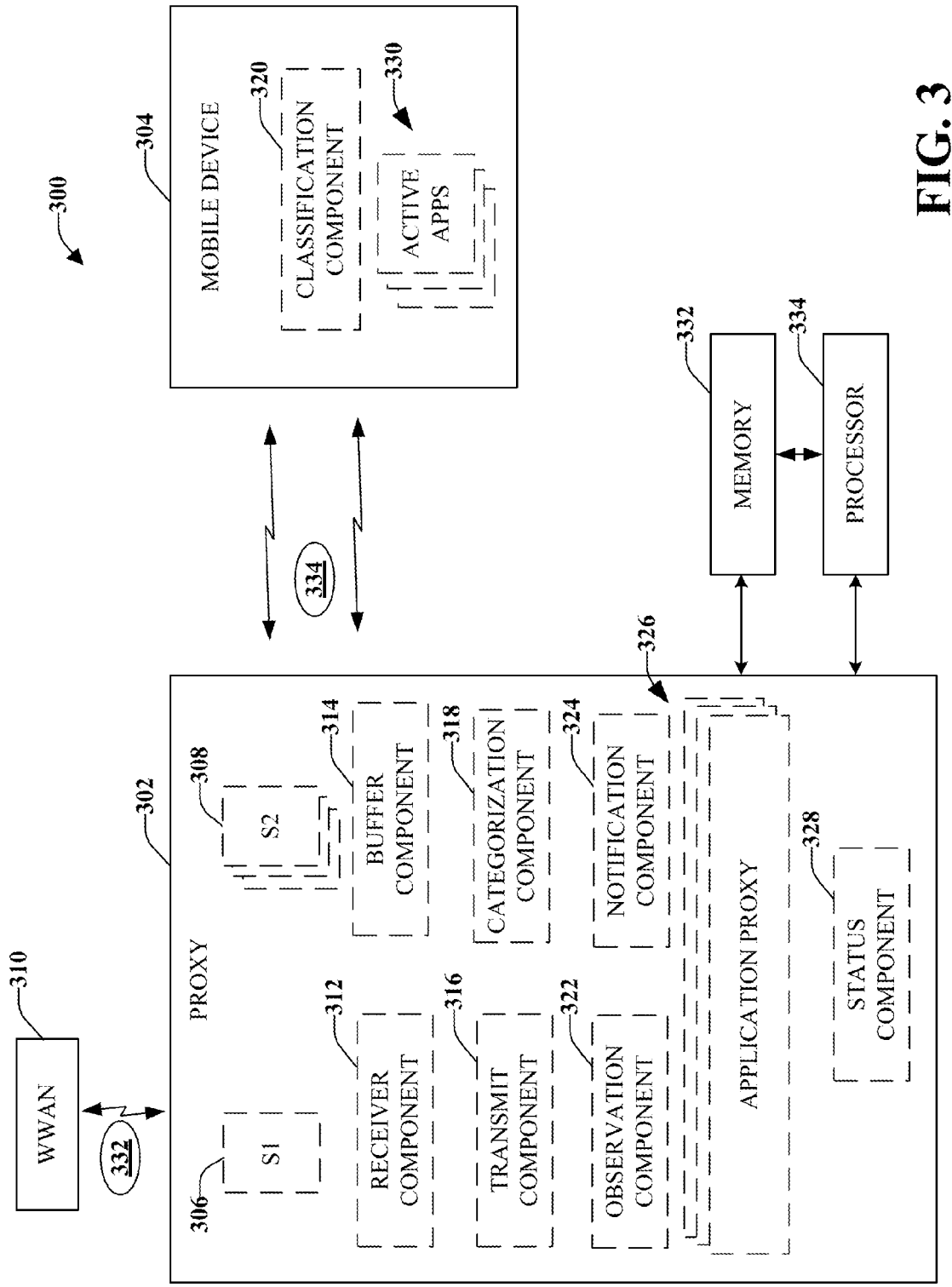
FIG. 3 illustrates a system for application-proxy support, according to an aspect.

FIG. 3 illustrates a system 300 for application-proxy support at a femto cell, according to an aspect. Mobile devices can be configured to support various types of applications that have different arrival rates, delay characteristics, and bandwidth requirements. There can be a large amount of energy lost in energy-state transitions to process information related to applications. A large amount of energy can also be lost while waiting for WWAN to suggest that mobile device should transition to a lower energy state. System 300 can be configured to provide a coarse-grain wireless application proxy support on a femto cell that can include a classification for data that can be used to buffer data for a mobile device and determine how long to delay (or to not delay) delivery of data to mobile device. Secondary WWAN states with a sideband control signaling mechanism can be utilized in an attempt to provide energy savings on mobile device. In accordance with some aspects, system 300 can be configured to utilize a fine grain proxy on a femto cell where femto cell runs application proxies for each mobile device for a subset of active applications on mobile device.

Included in system 300 is a wireless communications apparatus that can be a proxy 302, such as a femto-proxy, according to an aspect. Proxy 302 is configured to communicate with a mobile device 304 and attempt to conserve energy on mobile device 304. Proxy 302 is available to mobile device 304 over a wireless link.

Proxy 302 can provide a coarse-grain wireless application proxy that can buffer and deliver information to mobile device 304 and manage mobile device 304 state transitions. In accordance with some aspects, proxy 302 can be a fine grain proxy that can run application proxies for each mobile device (in a system having multiple mobile devices) for applications that are active on each mobile device.

Mobile device 304 can execute various states, as discussed with reference to FIG. 2. For example, mobile device 304 can attempt to execute the WWAN stack. However, with a proxy as disclosed herein, mobile device 304 can have one or more sideband paths that can be utilized in an attempt to conserve energy on mobile device 304. For example, proxy 302 and mobile device 304 can have general states and at least one parallel connection for a sideband path.

Figure 4:
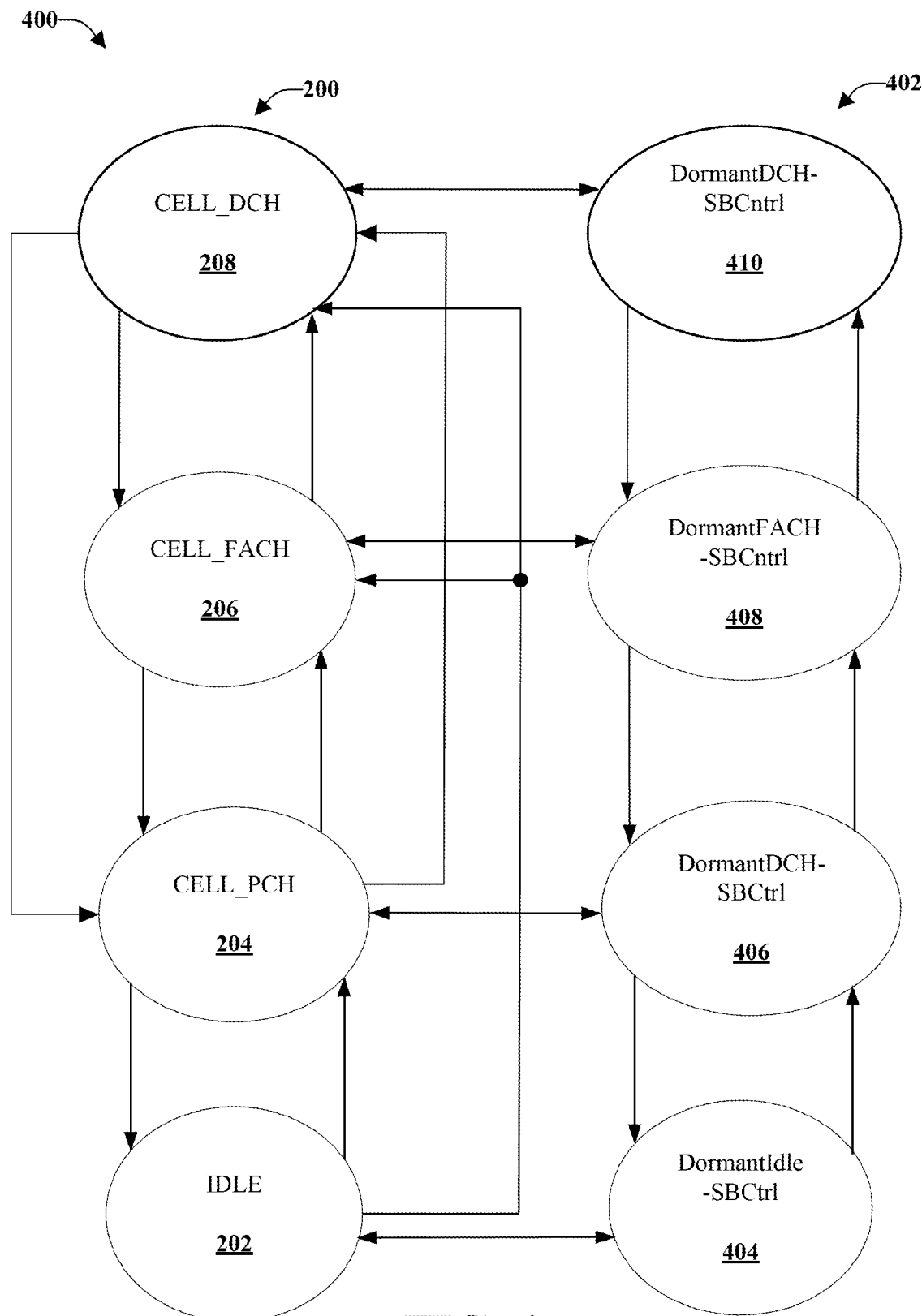
FIG. 4 illustrates a schematic representation of states, including dormant states, that a mobile device might be in while communicating with a network, according to an aspect.

FIG. 4 illustrates a schematic representation of states 400, including dormant states, that a mobile device might be in while communicating with a network, according to an aspect. Illustrated are WWAN states 200 for the WWAN stack, that include Idle State 202, Cell_PCH state 204, Cell_FACH state 206, and Cell_DCH state 208. Additionally, there are states in a sideband path 402. Although only one sideband path 402 is illustrated, there can be more than one sideband path, such as different sideband paths to support different air links (e.g., BlueTooth®, Wireless Local Area Network (WLAN), WWAN, Ultra-Wide Band (UWB), Peer-to-Peer, and so forth) between femto cell and mobile device.

Sideband path 402 provides a dormant version of each of the WWAN states 200 and includes a DormantIdle-SBCtrl State 404, a DormantPCH-SBCtrl State 406, a Dormant-FACH-SBCntrl State 408, and a DormantDCH-SBCntrl State 410. Sideband path 402 can be utilized to exchange data between proxy 302 and mobile device 304 (of FIG. 3). The data is controlled and moved by sideband path 402. Thus, mobile device 304 can be in DCH state, but is dormant as far as WWAN link is concerned but is active as far as sideband path is concerned.

With continuing reference to FIG. 3, proxy 302 is configured to maintain at least two states for mobile device 304, illustrated as a first state (S1 State 306) and a second state (S2 State 308). S1 State 306 can be a WWAN suggested state for mobile device 304 (e.g., WWAN states 200) and can be maintained for proxy 302 interaction with WWAN 310. S2 State 308 is a proxy 302 optimized state that is maintained for proxy 302 interaction with mobile device 304 (e.g., sideband path 402). There can be multiple S2 states, such as a different state for each of various protocols (e.g., BlueTooth®, Wireless Local Area Network (WLAN), and so forth). In accordance with some aspects, S2 State 308 can be a lower energy level (e.g., consumes less energy) relative to an energy level of S1 State 306. As a function of data rates or other criteria (e.g., classification), proxy 302 can decide to utilize S1 State 306 or S2 State 308. For example, if the data requires a high data rate and S1 State 306 has low capacity in terms of bandwidth, proxy 302 can decide to use S1 State to transfer data to mobile device 304. Irrespective of the state utilized, WWAN 310 can consider (or assume) that mobile device 304 is in S1 State and does not need to be aware of S2 state 308.

Data from WWAN 310 intended for mobile device 304 can be received by a receiver component 312 of proxy 302. For example, receiver component 312 can receive from WWAN 310 a first subset of data intended for mobile device 304. In accordance with some aspects, receiver component 312 can receive, from mobile device 304, data intended for WWAN 310 or for another device. According to another aspect, receiver component 312 can receive data, from another component, wherein the data is intended for mobile device 304, WWAN 310, or another device.

Data sent from WWAN 310 to mobile device 304 that is relayed by proxy 302 is processed by proxy 302. Proxy 302 is configured to convey data from WWAN 310 to mobile device. In accordance with some aspects, proxy 302 responds to the WWAN 310 on behalf of mobile device 304.

For example, the first set of data processed by proxy 302 can be buffered by a buffer component 314. Buffer component 314 selectively buffers the received data for later transmission to mobile device 304. The data can be buffered for various durations, both short durations and long durations. The first subset of data is sent to mobile device 304 by a transmit component 316. The first subset of data can be sent over a first wireless link after expiration of a delay associated with the first subset of data. According to an aspect, the delay is dynamically configurable. In accordance with some aspects, data is not buffered but is sent immediately, or substantially immediately, to mobile device 304, which can be determined as a function of the classification or based on other parameters (e.g., user preference). Thus, in accordance with some aspects, proxy 302 operates as a pass-through for a first subset of applications and as a proxy for a second subset of applications. According to some aspects, the processing by proxy 302 comprises a determination of whether to transmit the first subset of data to mobile device 304 and the first subset is selectively sent to mobile device 304 based on the determination.

In accordance with some aspects, buffer component 314 aggregates received data. For example, data can be aggregated based on an acceptable delay time, a classification, a quality of service, an application type, a configurable selection, or combinations thereof.

Acceptable delay times for each classification can be maintained by a categorization component 318 and can be based on a delay tolerance of data/application. Categorization component 318 can maintain information related to which path (e.g., WWAN path, sideband path) to utilize for each classification, which can be based on a bandwidth needed for data/application. In accordance with some aspects, levels of each classification (e.g., acceptable delay times, bandwidth needed, and so forth) are configurable.

According to some aspects, applications that are served for mobile device can be divided into multiple classes. If applications active at a given time are delay tolerant, the data can be buffered (which can be an aggregation of data) and mobile device does not need to wake-up as often as mobile device would be woken-up if data is sent at substantially the same time as received at proxy 302. For example, if there is no active voice call or no streaming video, then mobile device does not need to be woken-up every twenty milliseconds or so as it would be woken-up were a voice call or streaming video active. Thus, if the application is an email that is arriving, that email can be delay tolerant and mobile device might only need to be woken up about every two minutes (e.g., email does not need to be sent right away).

Classification of data can be included in a data header when network (e.g., WWAN 310) sends information to proxy 302. If included in the header, the classification might occupy about three bits of data. Alternatively or additionally, mobile device 304 can comprise a classification component 320 that can provide proxy 302 a desired effective (highest) class.

In an example, data or mobile device application can be classified as a function of Quality of Service (QoS) and can be subdivided into eight QoS classes. The eight QoS classes in this example are Class 7, Class 6, Class 5, Class 4, Class 3, Class 2, Class 1, and Class 0. Class 7 is reserved for delay critical information that should be delivered immediately, or substantially immediately. An example of Class 7 data is an incoming voice call. Class 6 is for delay sensitive data/applications that should be transmitted at a high data rate. Class 5 is for delay sensitive data/applications that can be transmitted at a low data rate. Class 4 is for delay tolerant data/applications that should be sent at a constant high data rate. Class 3 is for delay tolerant data/applications that should be sent at a bursty high data rate. Class 2 is for delay tolerant data/applications that should be sent at a constant low data rate. Delay tolerant data/applications that can be sent at a bursty low data rate are categorized as class 1. Data that is delay non-critical, such as advertisements that can be delivered at leisure, can be categorized with the lowest level, or Class 0. However, other classification schemes can be utilized.

In accordance with some aspects, classification component 320 can be associated with a user interface (e.g., display, keypad, and so forth) of mobile device 304. A user can interact with user interface and configure information (including classification) retained and communicated by classification component 320. For example, classification of data can be configured based on applications that are running on mobile device. For those applications that are active, a delay tolerance and bandwidth necessary can be dynamically changed and can influence the length of time mobile device is able to sleep before receiving data or an aggregation of data.

In accordance with some aspects, proxy 302 is aware of data traffic that will be received and categorization component 318 and/or buffer component 314 can maintain an internal mapping that corresponds arriving traffic with a classification of data associated with mobile device 304. For example, categorization component 318 might be aware that a class 4 application is arriving and corresponds that application to a configuration that class 4 applications can be held ninety seconds before being delivered to mobile device 304. In this case, the incoming data is buffered and delivered in ninety seconds. If other data has been previously received that is also a class 4 application, both data can be aggregated and sent in the time remaining for the previously received data (e.g., a time less than ninety seconds). Proxy 302 and mobile device 304 can have previously arranged settings, tolerable delays, and performance for each classification. Based on classifications, proxy 302 and mobile device 304 can decide to use a low data rate link (S2 State) or a high data rate link (S1 State).

In accordance with some aspects, there are multiple sideband paths (such as a sideband for BlueTooth®, a sideband for WWAN, and a sideband for WLAN, and so forth). The particular sideband path to utilize is determined as a function of a preference established between proxy 302 and mobile device 304, which can be indicated in the classification of the data. In accordance with some aspects, the sideband path to be utilized can be a function of the type of data/application or other criteria.

There can be classifications on a per application basis. For example, there can be three applications of class 1 and one application of class 6. Depending on whether a class 6 application arrived or a class 1 application arrived, proxy will perform differently. It is also possible that proxy is configured so that all applications are delivered to mobile device at substantially the same time as received at proxy.

Thus, all applications can be collapsed into one class and there is no need to differentiate between different applications.

Proxy 302 is aware of State S1 306 when utilizing State S2 308. Included in proxy 302 is an observation component 322 that is configured to monitor an availability of S2 308. At times, a control-sideband associated with State S2 308 might become unavailable or might be disabled. If the monitoring by observation component 322 indicates that State S2 308 is not available, a notification component 324 can instruct mobile device 304 to transition to State S1 306.

In accordance with some aspects, data classifications can be based on a Quality of Service (QoS) level. As a function of QoS level (or other classification), at least a subset of received data can be maintained by buffer component 314 for later transmission to mobile device 304. In accordance with some aspects, based on QoS level (or other classification), at least a subset of received data can be immediately, or substantially immediately, conveyed to mobile device 304. If a subset of received data is to be conveyed immediately, or substantially immediately, notification component 324 is configured to wake up mobile device 304 over an air link, such as sideband path. Waking up mobile device over the air link can be performed quicker by proxy relative to how quickly WWAN 310 can wake up mobile device. In accordance with some aspects, proxy 302 can send mobile device 304 to FACH or Idle states faster than a network can send mobile device to these states.

In accordance with some aspects, proxy 302 can aggregate data from different classifications and deliver aggregated data to mobile device 304 in a data burst. After transmission of the data burst, proxy 302 can instruct mobile device 304 to transition back to a low energy mode. Aggregating data at buffer component 314 can allow mobile device 304 to sleep (or stay in idle mode) for long durations, which can help conserve mobile device resources.

For example, the data might be handled by proxy 302 and mobile device 304 is woken up when there is important data available, which can be determined based on a user configuration or based on other parameters (e.g., data type, application type, or other criteria). In accordance with some aspects, proxy 302 can wake up mobile device 304 over a broadcast channel, such as a page. According to some aspects, proxy 302 and mobile device 304 are in a periodic wake up, wherein once a minute or so, the devices exchange data. However, other manners of communicating data are also possible according to various aspects.

For example, using the Classes of the above example, data from Class 0 is being received and buffered. Data from Class 7 arrives and should be delivered immediately. An indication is signaled over the sideband path that a Class 7 has arrived. When the Class 7 data is delivered, the Class 0 data that is buffered can piggyback and be sent after the Class 7 data is delivered. In accordance with some aspects, the Class 0 data remains buffered and can be sent at a different time.

The following is an example DCH-mode application according to an aspect. There is bursty data of 50 Kbytes or 400 Kbits arriving once every minute (e.g., email arriving once a minute). A 400 Kbps WWAN link can transfer this data in one second. Assume, for this example, the DCH to FACH idle time is fifteen seconds. If Femto-Mobile Device interaction uses state S2, then Mobile Device has to remain in DCH mode for fifteen additional seconds (wasting energy) waiting for more data, which might not arrive within that fifteen seconds. If Femto-Mobile Device interaction uses state S2, then Mobile Device can stay in DCH mode for Y seconds, where Y is less than fifteen seconds (Y>15 seconds), and then transition to dormantDCH mode. The BlueTooth® Control (Cntrl) side band is active in dormant DCH mode. Mobile device stays in BlueTooth® sniff mode and wakes up periodically. Assuming an average 201 mA consumed in DCH mode, and 1 mA average current consumed in dormant DCH mode with BTCntrlSideband. The energy saved during fifteen seconds prior to DCH mode exit if Y=2 seconds is 2600 mAs (derived from ((201−1)(15−Y))=(200*13)=2600 mAs). Additional energy can be saved until the next data arrival depending on states transitioned to in each state machine.

In accordance with some aspects, proxy 302 can be configured to provide fine-grain wireless application proxy support. Proxy 302 can include a plurality of application proxies and can run an application proxy 326 for each mobile device for those applications that are active on a mobile device. Proxy 302 can comprise a status component 328 that is configured to identify active applications 330 on each mobile device 304. An application proxy 326 is operated for one or more of the active applications 330. Each application proxy 326 is configured to buffer data. The buffered data is delivered to mobile device based on a configurable delay. The configuration for fine-grain wireless application proxy support can include explicit porting of applications to proxy. Application proxies receive and buffer data from network (for one or more active applications) and deliver data to mobile device based on a configurable delay. The higher the delay, the more energy that can be saved on mobile device. For example, an email application is running Email data is received by application proxy and synchronized with mobile device at a later time. It is possible that all data for mobile device is received on femto-proxy. In accordance with some aspects, femto-proxy can operate and receive data for mobile device when mobile device is not in communication with femto-proxy (e.g., away from house where femto-proxy is installed). When mobile device acquires a connection with femto-proxy, mobile device receives data that was buffered by femto-proxy. Application proxy can be actively active in the sense that mobile device is within range of femto-proxy. Application proxy can be active and receiving data for mobile device even if mobile device is not within range of femto-proxy. Mobile device can set up femto-proxy and indicate, for example, that advertisements sent over the air should be received by femto-proxy and buffered. Later, mobile device can retrieve the advertisements from femto-proxy, if desired.

In accordance with some aspects, application proxy 326 can keep-alive messages to the network on behalf of proxied applications (e.g., instant messenger applications, VoIP applications, and so forth) associated with mobile device 304. Application proxy 326 can also respond to synchronization messages and update messages from network.

According to some aspects, mobile device 304 can sleep while one or more application proxies communicate with network (and other devices) on behalf of mobile device 304. When a significant event (e.g., voice call), shown at 332, associated with a proxied application is received from network, application proxy 326 can send a wake-up message 334 to mobile device 304 over at least one wireless link between mobile device 304 and proxy 302. Wake-up message 334 allows mobile device 304 to be woken up so that a user of mobile device 304 can receive the voice call or other significant event.

According to some aspects, a mobile device optimized state can be supported at femto-proxy. Mobile device-specific data can be buffered at femto-proxy, if necessary.

Since femto-proxy only supports a few clients (e.g., mobile devices), femto-proxy can be configured to perform additional processing to WWAN power state optimization for each mobile device. Mobile-device optimized state transition delays can be configured based on current needs of mobile device such as voice only, email and voice, web and voice, email and instant message applications and web and voice.

According to some aspects, femto-proxy can support mobile device-optimized lower-energy state (e.g., S2 state) at femto-proxy when using BlueTooth® control signaling sideband. Femto-proxy can select S2 State based on current utilization, buffering capabilities in femto-proxy, application-awareness in femto-proxy, response times over BlueTooth®-control-signaling-sideband path, or combinations thereof.

According to an aspect, femto-proxy can aggressively power down mobile device to a state S2 while the remainder of network maintains resources for a higher energy/data-rate state S1 for mobile device.

A memory 336 can be operatively coupled to proxy 302. Memory 336 can be external to proxy 302 or can reside within proxy 302. Memory 336 can store information related to application proxies and other suitable information related to signals transmitted and received in a communication network.

Memory 336 can retain instructions related to supporting communications for a mobile device with a wireless wide area network and providing application proxy support for a subset of applications associated with the mobile device. Memory 336 can retain further instructions related to receiving from the wireless wide area network a first subset of data intended for the mobile device, buffering the first subset of data for later transmission to the mobile device, and conveying the first subset of data to the mobile device over the first wireless link after an expiration of a delay associated with the first subset of data.

In accordance with some aspects, memory 336 retains further instructions related to maintaining at least two states for the subset of applications associated with the mobile device. The instructions related to maintaining comprise instructions related to reserving a first state for at least one interaction between the communications apparatus and the wireless wide area network and reserving a second state for at least one interaction between the communications apparatus and the mobile device.

According to some aspects, memory 336 retains further instructions related to identifying active applications on the mobile device, operating an application proxy for one or more of the active applications, buffering data associated with each active application, and delivering the buffered data to the mobile device after expiration of a configurable delay.

Memory 336 can store protocols associated with application proxy support at a femto cell, taking action to control communication between proxy 302 and mobile device 304, etc., such that proxy 302 can employ stored protocols and/or algorithms to achieve improved communications in system 300. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 338 can be operatively connected to proxy 302 (and/or memory 336) to facilitate analysis of information related to application-proxy support at a femto cell in a communication network. Processor 338 can be a processor dedicated to analyzing and/or generating information received by proxy 302 and/or a processor that controls one or more components of proxy 302.

In accordance with some aspects, processor 338 can include a first module that supports communications for a mobile device. Processor 338 includes a second module that provides application proxy support for a subset of applications associated with the mobile device. Also included in processor 338 is a third module that receives from wireless wide area network a first subset of data intended from the mobile device and a fourth module that process the first subset of data.

According to some aspects, processor 338 comprises a fifth module that buffers the first subset of data for later transmission to the mobile device. Processor 3384 also comprises a sixth module that conveys the first subset of data to the mobile device over a first wireless link after expiration of a delay associated with the first subset of data. The delay can be dynamically configurable.

Figure 5:
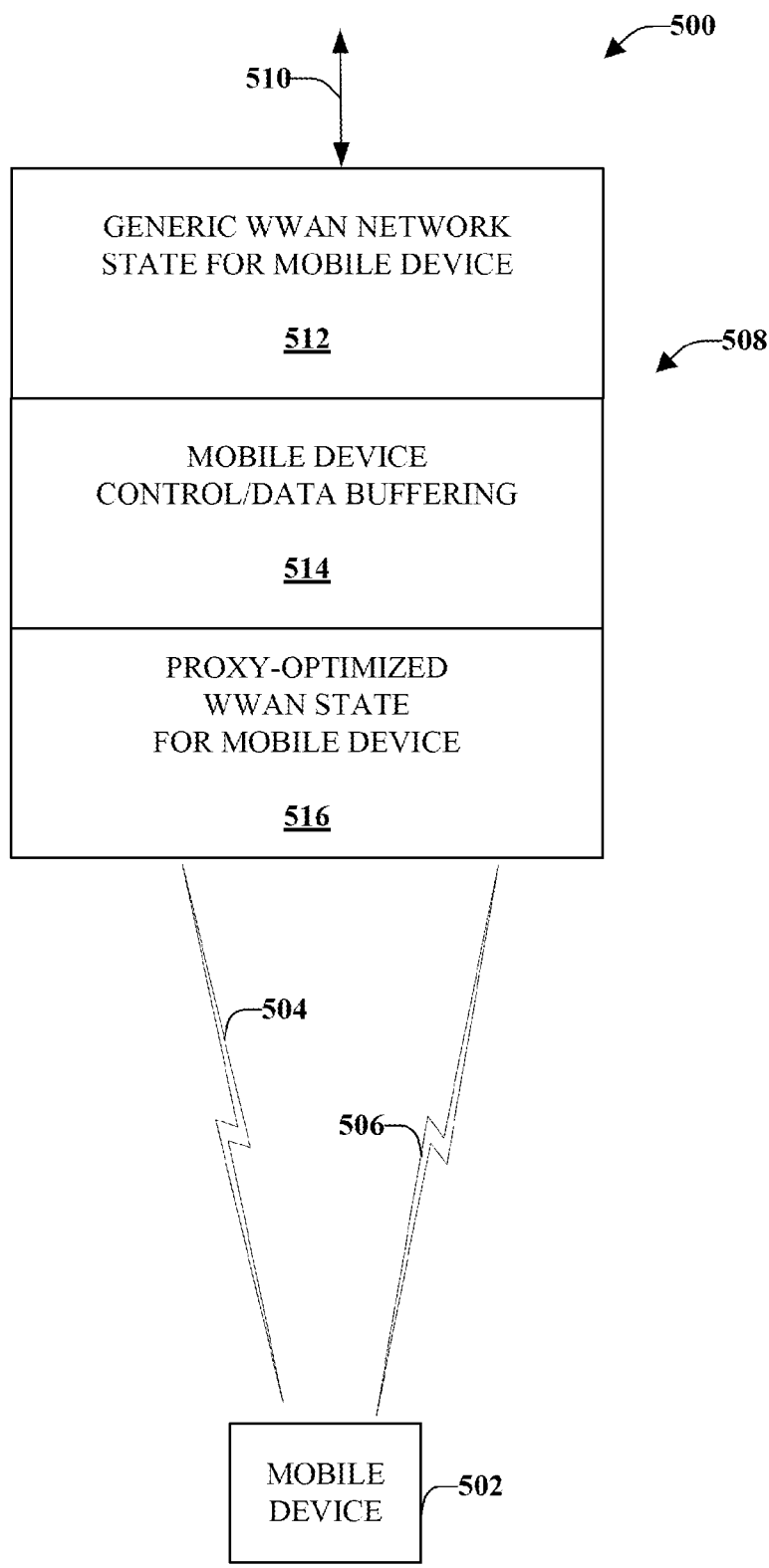
FIG. 5 illustrates a schematic representation of an example system for mobile device optimized wireless wide area network state at a proxy (e.g., a femto-proxy), according to an aspect.

FIG. 5 illustrates a schematic representation of an example system 500 for mobile device optimized WWAN state at a proxy (e.g., a femto-proxy), according to an aspect. A mobile device 502 is configured to communicate over a WWAN protocol link 504 and one or more other links 506 such as a BlueTooth® link or an alternate short range protocol link or other protocol link (e.g., sideband path). A proxy 508 can communicate with a network over a tunnel 510. Proxy 508 can buffer data and deliver data to mobile device 502 in an attempt to optimize a state of mobile device 502. In accordance with some aspects, data is not transported on the WWAN protocol link 504 but is transported over one of the other links 506 (e.g., peer-to-peer, UWB, BlueTooth®, and so on). Proxy 508 can be in different states, such as a Generic WWAN network state 512 for mobile device, a mobile device control/data buffering state 514, and/or a proxy-optimized WWAN state 516 for mobile device. There can be an arrangement between proxy 508 and mobile device 502 related to when to send data (e.g., tolerable delay).

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
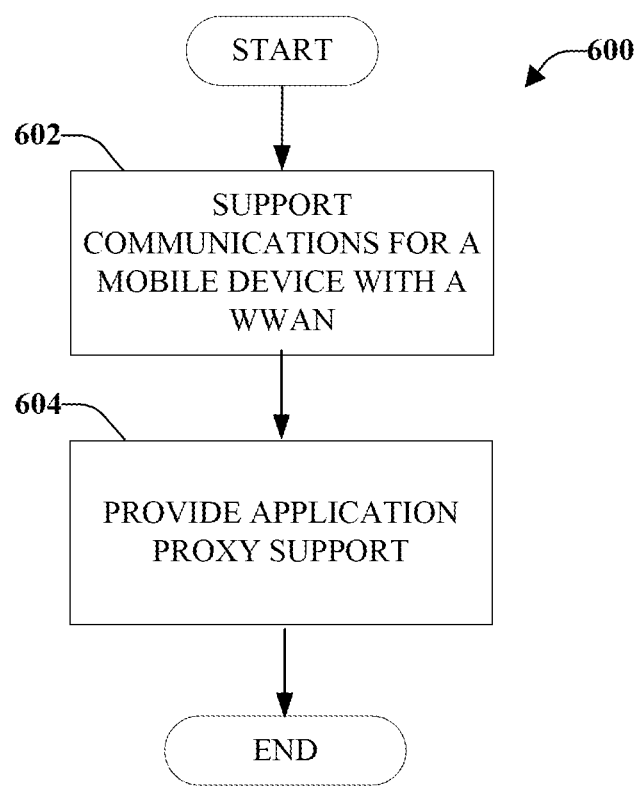
FIG. 6 illustrates a method used in a communications environment at a wireless node, according to an aspect.

FIG. 6 illustrates a method 600 used in a communications environment at a wireless node, according to an aspect. Method 600 starts, at 602, when communications for a mobile with a wireless wide area network (WWAN) are supported. Wireless node is accessible to mobile device over a first wireless link. At 604, application proxy support is provided at wireless node for a subset of applications associated with mobile device.

In accordance with some aspects, first subset of data is delivered by wireless node to mobile device over a second wireless link. First wireless link and/or second wireless link can be selected to minimize energy utilization for wireless communications between wireless node and mobile device. In accordance with some aspects, at least one wireless link between mobile device and wireless node is encrypted. An availability of second state is dependent on availability of second wireless link. According to some aspects, wireless node is a femto cell. In accordance with some aspects, the subset of applications associated with the mobile device comprises all applications associated with mobile device.

In accordance with some aspects, method 600 includes identifying active applications on mobile device and running an application proxy for one or more of the identified active applications.

According to some aspects, method 600 comprises waking up mobile device over at least one wireless link between mobile device and wireless node upon arrival of a significant event (e.g., voice call, emergency call, urgent text message) associated with a proxied application.

Figure 7:
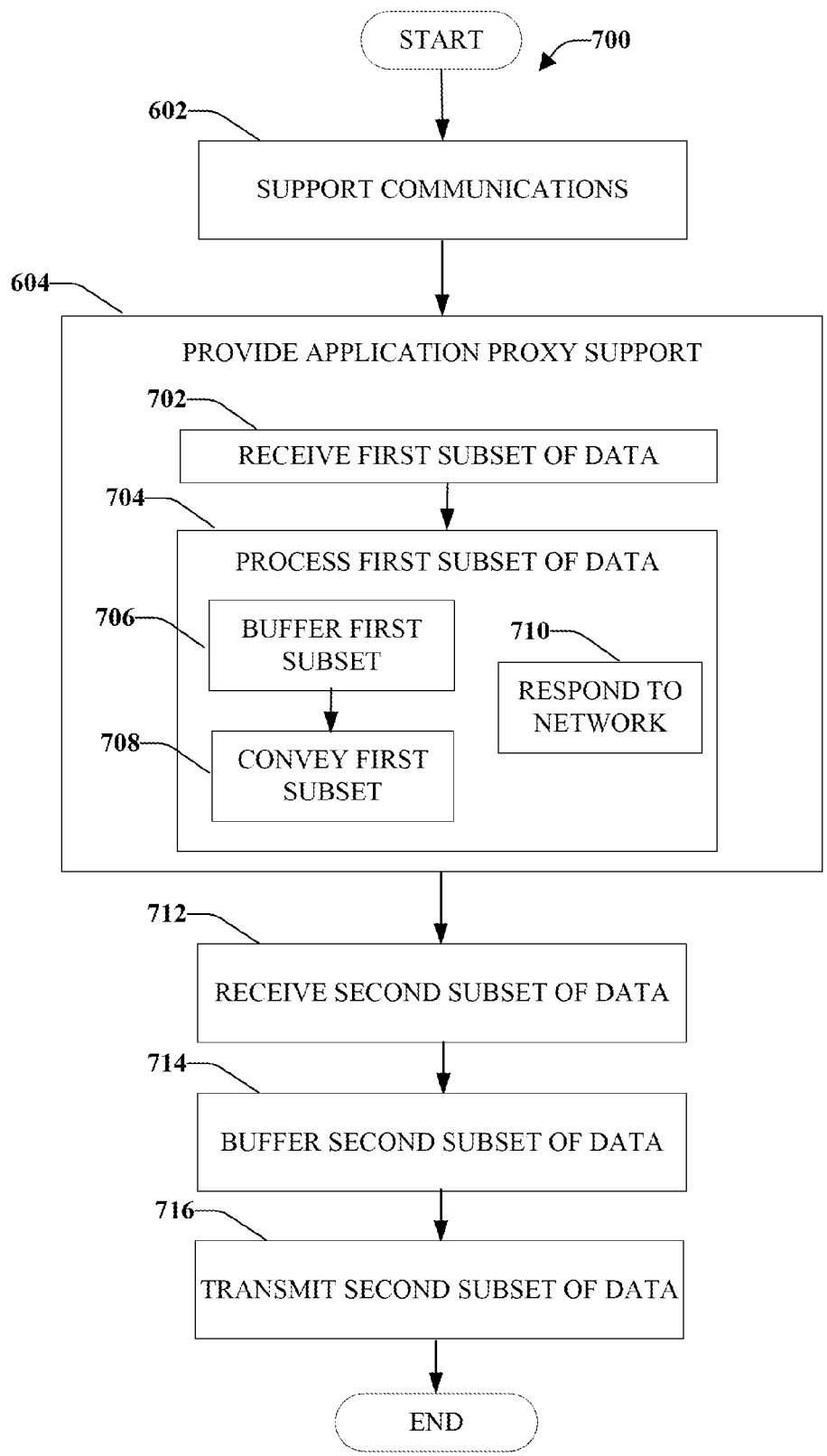
FIG. 7 illustrates another method used in a communications environment at a wireless node, according to an aspect.

FIG. 7 illustrates another method used in a communications environment at a wireless node, according to an aspect. At 602 is supporting communications for a mobile device with a WWAN and, at 604, is providing application proxy support for a subset of applications associated with mobile device. Providing the application proxy support can include, at 702, receiving from WWAN a first subset of data intended for the mobile device and, at 704, processing the first subset of data.

In accordance with some aspects, the processing, at 704, comprises buffering the first subset of data for later transmission to mobile device. First subset of data can be buffered as a function of a configurable selection, an acceptable delay time, a classification, a quality of service, an application type, or combinations thereof. In accordance with some aspects, first subset can be buffered for later transmission to mobile device. For example, first subset can be data that is delay tolerant. According to an aspect, the classification is received in a header of the data. In accordance with some aspects, the classification is obtained from mobile device before (or substantially the same time as) receiving data. For example, the classification can be configured by a user of mobile device and communicated to femto cell.

In accordance with some aspects, buffering data includes aggregating data from different classifications. The different classifications can be classifications for delay tolerant data that can be sent at different data rates (e.g., deliver at leisure, burst low data rate, constant low data rate, bursty high data rate, and so on). The aggregated data can be conveyed to mobile device in a data burst. For example, data might be aggregated for a selected period of time (e.g., five minutes). After expiration of the interval, data that has been aggregated is transmitted. Mobile device can be instructed to enter a low energy mode after receipt of aggregated data.

At 708, the first subset of data is conveyed to mobile device over first wireless link after expiration of a delay associated with first subset of data. The delay can be dynamically configurable. In accordance with some aspects, the processing also comprise determining whether to transmit first subset of data to mobile device, wherein the conveying is performed based on the determination. In accordance with some aspects, the processing, at 704, comprises communicating to the WWAN on behalf of a proxied application associated with mobile device, at 710.

According to some aspects, method 700 continues, at 712, when a second subset of data is received. Second subset of data is buffered, at 714. In accordance with some aspects, the buffering, at 714, comprises aggregating data and the conveying, comprises delivering the aggregated data to mobile device in a data burst. Method 700 can also comprise instructing mobile device to enter a low energy mode after receipt of the aggregated data. The aggregating can be based on a classification, a quality of service, an application type, a configurable selection, an acceptable delay time, or combinations thereof.

Second subset of data is transmitted, at 716, at substantially the same time as first subset of data is transmitted. Second subset of data can be buffered and can be can be transmitted to mobile device after expiration of a configurable delay associated with second subset. For example, if second subset of data has a delay tolerance of sixty seconds, after expiration of sixty seconds, second subset can be sent to mobile device.

Figure 8:
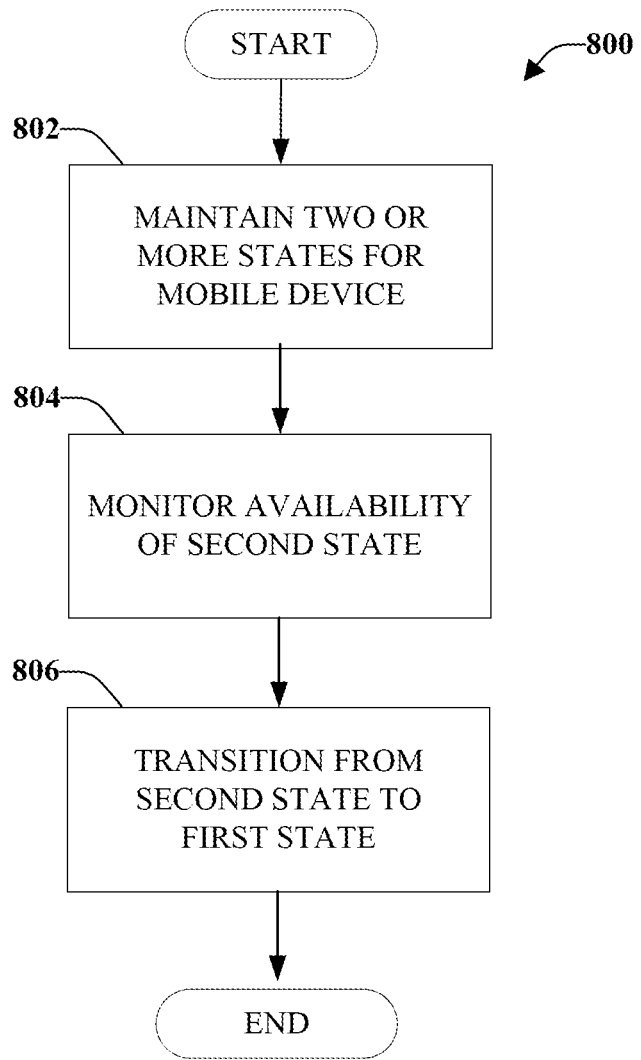
FIG. 8 illustrates a method used in a communications environment for application-proxy support, according to an aspect.

FIG. 8 illustrates a method 800 used in a communications environment for application-proxy support, according to an aspect. Method 800 can be configured to attempt to save mobile device energy and other resources by buffering data and delivering data to mobile device after a tolerable delay.

Method 800 can be performed by a wireless node and starts, at 802, with maintaining at least two states for a mobile device. Mobile device can already be associated with a wireless node. For example, wireless node can be integrated with a femto cell that is installed in a user's home. Mobile devices used by user (and family members) can be known to femto cell. In accordance with some aspects, mobile device is a device that has been brought into range of femto cell and utilizes femto cell to facilitate communications (e.g., deployed in an unplanned manner). For example, a friend can be visiting the family and friend can utilize femto cell while in the house.

The at least two states can comprise a first state that is for interaction with a wireless wide area network and a second state is for interaction with mobile device. The maintaining, at 802 can include reserving a first state for at least one interaction between wireless node and WWAN and reserving a second state for at least one interaction between wireless node and mobile device. In accordance with some aspects, second state is maintained at a lower energy level relative to an energy level of first state. According to some aspects, first state is reserved for interaction between femto cell and wireless wide area network and second state is reserved for interaction between femto cell and mobile device.

In accordance with some aspects, method 800 continues, at 804, with monitoring availability of the second state. At 806, the mobile device is transitioned from second state to first state if the monitoring indicates the second state is not available. According to some aspects, availability of the second state is dependent on availability of the second state.

A first subset of data can be conveyed on the first state. In an example, first subset of data can be conveyed over first state or over second state. The determination of which state to utilize for first subset of data can be based on an amount of bandwidth needed for the data, a quality of service, or based on other parameters. First subset of data can be data that is delay sensitive and should be conveyed immediately, or substantially immediately, to mobile device.

In accordance with some aspects, monitoring availability of second state is performed periodically or continuously. Monitoring can occur while data is being transmitted over second state or at other times. If monitoring indicates second state might no longer be available, mobile device can be transitioned from second state to first state. Data is conveyed to mobile device over first state.

In accordance with some aspects, a computer program product can include a computer-readable medium that comprises codes for carrying out various aspects of methods. Computer-readable medium can include a first set of codes for causing a computer to support communications for a mobile device with a wireless wide area network and a second set of codes for causing computer to provide application proxy support for a subset of applications associated with the mobile device.

According to some aspects, computer-readable medium comprises a third set of codes for causing computer to receive from wireless wide area network a first subset of data intended for the mobile device and a fourth set of codes for causing the computer to buffer the first subset of data for later transmission to the mobile device. Also included is a fifth set of codes for causing computer to convey the first subset of data to the mobile device over a first wireless link after expiration of a delay associated with the first subset of data.

Figure 9:
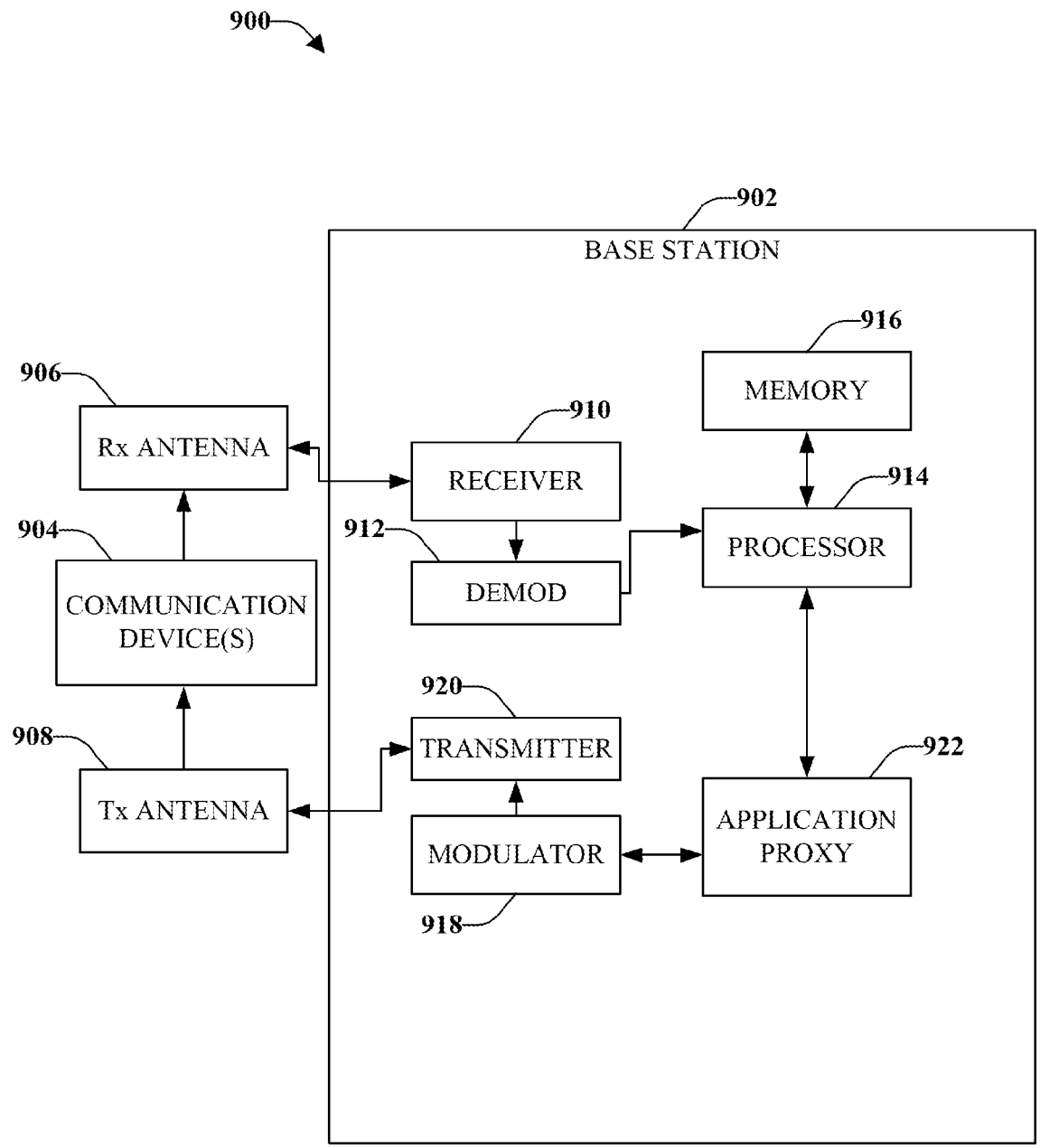
FIG. 9 illustrates a system that facilitates proxy support in accordance with various aspects presented herein.

FIG. 9 is an illustration of a system 900 that facilitates proxy support at a femto cell in accordance with various aspects presented herein. System 900 comprises an access point or base station 902. As illustrated, base station 902 receives signal(s) from one or more communication devices 904 (e.g., user device) by a receive antenna 906, and transmits to the one or more communication devices 904 through a transmit antenna 908.

Base station 902 comprises a receiver 910 that receives information from receive antenna 906 and is operatively associated with a demodulator 912 that demodulates received information. Demodulated symbols are analyzed by a processor 914 that is coupled to a memory 916 that stores information related to broadcast-multicast waveforms embedded in a unicast waveform. A modulator 918 can multiplex the signal for transmission by a transmitter 920 through transmit antenna 908 to communication devices 904.

Processor 914 is further coupled to an application proxy 922 that can be configured to receive data intended for a mobile device. The received data can be buffered and delivered to mobile device after a configurable delay. In accordance with some aspects, the received data can be aggregated with other data and sent, as aggregated data, to mobile device after a configurable delay. In accordance with some aspects, data is transmitted to mobile device at substantially the same time as received at application proxy 922. The determination whether to buffer data, aggregate data, send data substantially immediately, and the configurable delay can be based on a classification of the data. Application proxy 922 can determine a data path (e.g., WWAN, sideband, and so on) to utilize to send data to mobile device as a function of the classification and/or an availability of a data path.

Figure 10:
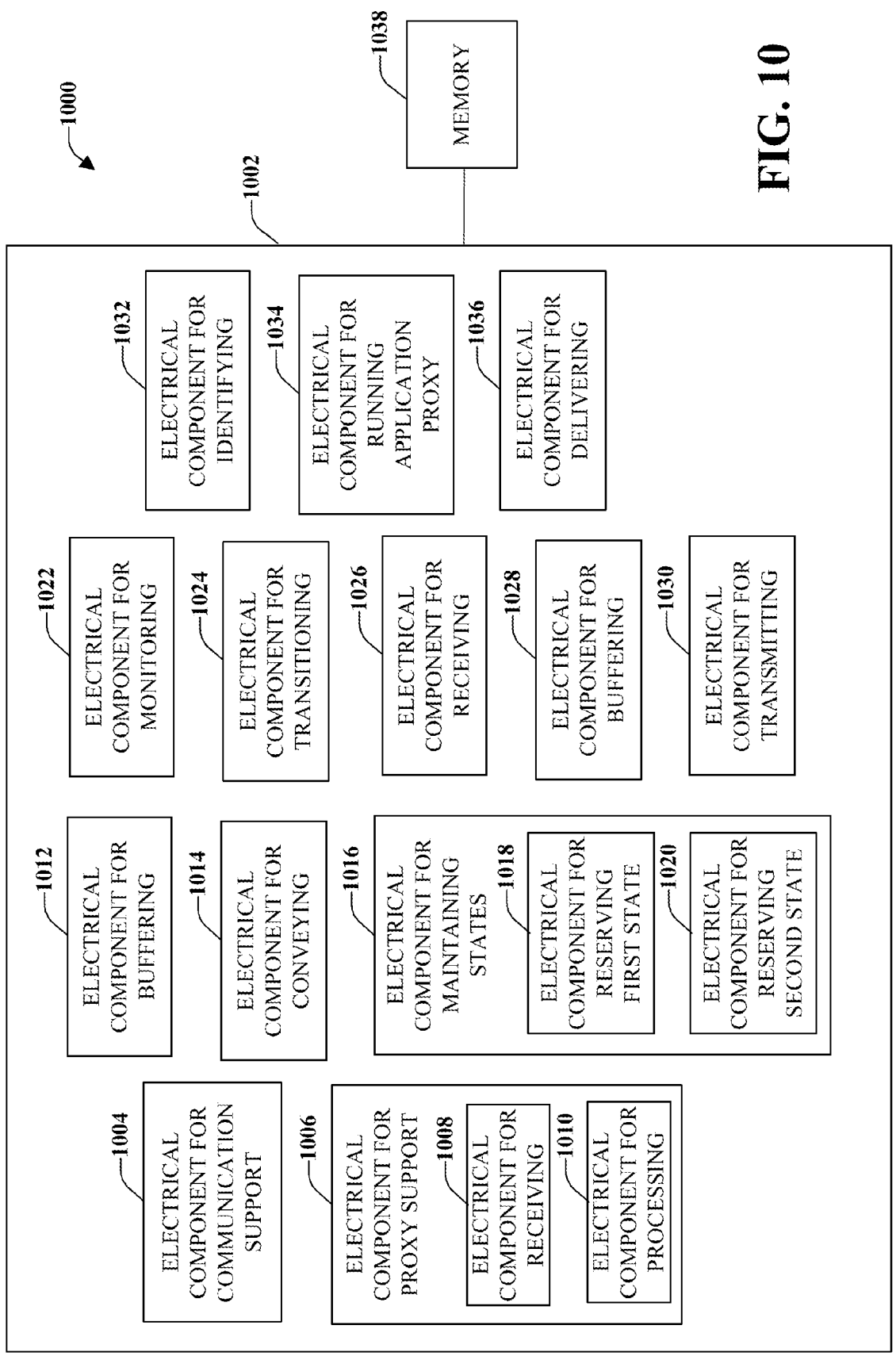
FIG. 10 illustrates an example system that provides proxy support according to an aspect.

With reference to FIG. 10, illustrated is an example system 1000 that provides proxy support according to an aspect. System 1000 may reside at least partially within a femto cell. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 may include an electrical component 1004 for supporting communications for a mobile device with a wireless wide area network. Logical grouping 1002 also includes an electrical component 1006 for providing application proxy support for a subset of applications associated with mobile device. In accordance with some aspects, electrical component 1006 comprises an electrical component 1008 for receiving from wide area network a first subset of data intended for mobile device and an electrical component 1010 for processing the first subset of data.

In accordance with some aspects, logical grouping 1002 comprises an electrical component 1012 for buffering first subset of data for later transmission to mobile device. Also included in logical grouping 1002 is an electrical component 1014 for conveying first subset of data to mobile device over a first wireless link after expiration of a delay associated with first subset of data.

In accordance with some aspects, logical grouping 1002 comprises an electrical component 1016 for maintaining at least two states for the subset of applications associated with the mobile device. Electrical component 1016 can comprises an electrical component 1018 for reserving a first state for at least one interaction with wireless wide area network and an electrical component 1020 for reserving a second state for at least one interaction with mobile device.

According to some aspects, logical grouping 1002 includes an electrical component 1022 for monitoring an availability of second state. Also included in logical grouping 1002 is an electrical component 1024 for transitioning mobile device from second state to first state if electrical component 1022 indicates second state is not available. Electrical component 1014 sends first subset of data on first state. According to some aspects, logical grouping 1002 comprises an electrical component 1026 for receiving a second subset of data, an electrical component 1028 for buffering the second subset of data, and an electrical component 1030 for transmitting the second subset of data at substantially the same time as first subset of data.

In accordance with some aspects, logical grouping 1002 includes an electrical component 1032 for identifying active applications on mobile device and an electrical component 1034 for running an application proxy for one or more active applications. Also included in logical grouping 1002 is an electrical component 1036 for delivering the buffered data to mobile device based on a configurable delay.

Additionally, system 1000 can include a memory 1038 that retains instructions for executing functions associated with electrical components 1004-1036 or other components. While shown as being external to memory 1038, it is to be understood that one or more of electrical components 1004-1036 may exist within memory 1038.

Figure 11:
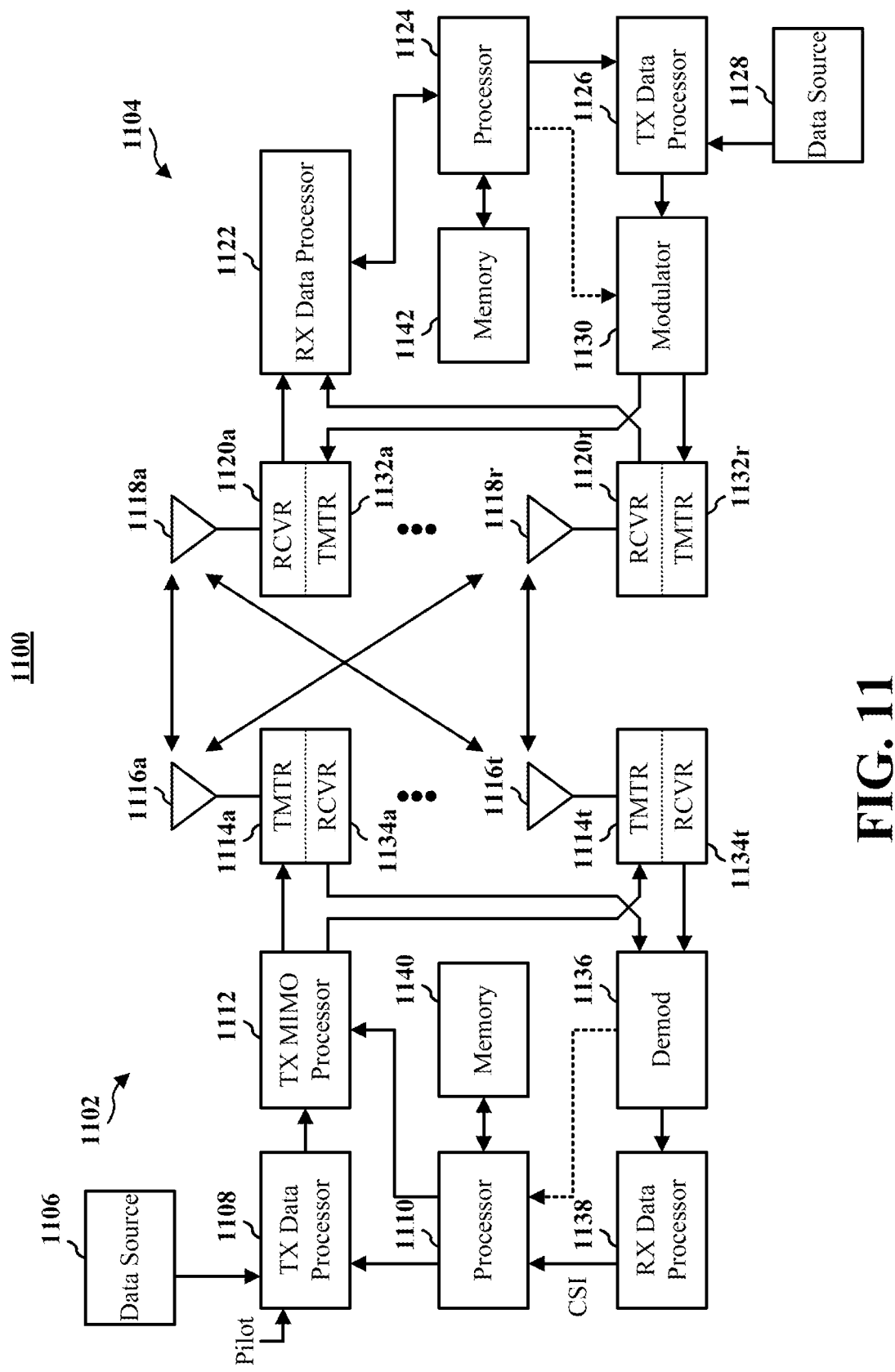
FIG. 11 illustrates an example wireless communication system, according to an aspect.

FIG. 11 illustrates an example wireless communication system 1100. Wireless communication system 1100 depicts one base station 1102 and one mobile device 1104 for sake of brevity. However, it is to be appreciated that wireless communication system 1100 can include more than one base station and/or more than one mobile device, wherein additional base stations and/or mobile devices can be substantially similar or different from example base station 1102 and mobile device 1104 described below. In addition, it is to be appreciated that base station 1102 and/or mobile device 1104 can employ the systems and/or methods described herein to facilitate wireless communication there between.

At base station 1102, traffic data for a number of data streams is provided from a data source 1106 to a transmit (TX) data processor 1108. According to an example, each data stream can be transmitted over a respective antenna. TX data processor 1108 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1104 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1110.

The modulation symbols for the data streams can be provided to a TX MIMO processor 1112, which can further process the modulation symbols (e.g., for OFDM). TX MIMO processor 1112 then provides NT modulation symbol streams to NT transmitters (TMTR) 1114a through 1114t. In various embodiments, TX MIMO processor 1112 applies beamforming weights to the symbols of the data streams and to the antenna from which the symbol is being transmitted.

Each transmitter 1114 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1114a through 1114t are transmitted from NT antennas 1116a through 1116t, respectively.

At mobile device 1104, the transmitted modulated signals are received by NR antennas 1118a through 1118r and the received signal from each antenna 1118 is provided to a respective receiver (RCVR) 1120a through 1120r. Each receiver 1120 conditions (e.g., filters, amplifies, and downconverts) a respective signal, digitizes the conditioned signal to provide samples, and further processes the samples to provide a corresponding "received" symbol stream.

An RX data processor 1122 can receive and process the NR received symbol streams from NR receivers 1120 based on a particular receiver processing technique to provide NT "detected" symbol streams. RX data processor 1122 can demodulate, deinterleave, and decode each detected symbol stream to recover the traffic data for the data stream. The processing by RX data processor 1122 is complementary to that performed by TX MIMO processor 1112 and TX data processor 1108 at base station 1102.

A processor 1124 can periodically determine which precoding matrix to utilize as discussed above. Further, processor 1124 can formulate a reverse link message comprising a matrix index portion and a rank value portion.

The reverse link message can comprise various types of information regarding the communication link and/or the received data stream. The reverse link message can be processed by a TX data processor 1126, which also receives traffic data for a number of data streams from a data source 1128, modulated by a modulator 1130, conditioned by transmitters 1132a through 1132r, and transmitted back to base station 1102.

At base station 1102, the modulated signals from mobile device 1104 are received by antennas 1116, conditioned by receivers 1134a though 1134t, demodulated by a demodulator 1136, and processed by a RX data processor 1138 to extract the reverse link message transmitted by mobile device 1104. Further, processor 1110 can process the extracted message to determine which precoding matrix to use for determining the beamforming weights.

Processors 1110 and 1124 can direct (e.g., control, coordinate, manage, etc.) operation at base station 1102 and mobile device 1104, respectively. Respective processors 1110 and 1124 can be associated with memory 1140 and 1142 that store program codes and data. Processors 1110 and 1124 can also perform computations to derive frequency and impulse response estimates for the uplink and downlink, respectively.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BlueTooth® and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method used in a communications environment at a wireless node, comprising:
   supporting communications for a mobile device with a wireless wide area network; and
   providing application proxy support at the wireless node for a subset of applications running on the mobile device, wherein providing application proxy support includes transmitting a message to the mobile device instructing the mobile device to operate in a low energy consumption mode until a synchronization event occurs between the wireless node and the mobile device, and wherein providing application proxy support further includes:
   buffering a plurality of data sets, for respective different applications from the subset of applications running on the mobile device, from the wireless wide area network intended for the mobile device, and
   for each of the buffered plurality of data sets, causing the mobile device to wake-up after a corresponding delay associated with a respective one of the different applications from the subset of applications running on the mobile device that is based, at least in part, on delay tolerance and bandwidth requirements associated with the respective one of the different applications from the subset of applications running on the mobile device such that a first wakeup delay for a first application from the subset of applications running on the mobile device is different from a second wakeup delay for a second, different, application from the subset of applications running on the mobile device, transmitting the respective each of the buffered plurality of data sets to the awakened mobile device, and instructing the mobile device to transition to the low energy consumption mode after transmission of the each of the buffered plurality of data sets;
   wherein the wireless node is accessible to the mobile device over a first wireless link.

2. The method of claim 1, wherein the providing comprises:
   receiving from the wireless wide area network a first subset of data intended for the mobile device; and
   processing the first subset of data.

3. The method of claim 2, wherein the processing comprises:
   buffering the first subset of data for later transmission to the mobile device; and
   conveying the first subset of data to the mobile device over the first wireless link after an expiration of a delay associated with the first subset of data and with an application, running on the mobile device, to process the first subset of data.

4. The method of claim 3, wherein the delay is dynamically configurable.

5. The method of claim 3, wherein the processing comprises determining whether to transmit the first subset of data to the mobile device.

6. The method of claim 5, wherein the conveying is performed based on the determination.

7. The method of claim 1, wherein the providing comprises communicating to the wireless wide area network on behalf of a proxied application associated with the mobile device.

8. The method of claim 2, further comprising:
   receiving a second subset of data;
   buffering the second subset of data; and
   transmitting the second subset of data at substantially the same time as the first subset of data.

9. The method of claim 8, wherein the buffering comprises aggregating data and the conveying comprises delivering the aggregated data to the mobile device in a data burst, the method further comprises instructing the mobile device to enter the low energy consumption mode after receipt of the aggregated data.

10. The method of claim 9, wherein the aggregating is based on a classification, a quality of service, an application type, a configurable selection, an acceptable delay time, or combinations thereof.

11. The method of claim 1, further comprising:
maintaining at least two states for the subset of applications associated with the mobile device at the wireless node, wherein the maintaining comprises reserving a first state for at least one interaction between the wireless node and the wireless wide area network and reserving a second state for at least one interaction between the wireless node and the mobile device.

12. The method of claim 11, wherein the second state is the low energy consumption mode and represents a lower energy state for the mobile device compared to the first state.

13. The method of claim 1, wherein the first application, with the first wakeup delay, is an instant messaging application, and wherein the second, different, application, with the second wakeup delay, is one of an email application, voice application, browser application, or video application.

14. The method of claim 1, wherein providing the application proxy support comprises:
performing a coarse synchronization with the subset of applications running on the mobile device based on an occasional wakeup for synchronization according to the wakeup delays associated with the different applications of the subset of applications running on the mobile device.

15. The method of claim 1, wherein a first subset of data is delivered by the wireless node to the mobile device over a second wireless link.

16. The method of claim 15, wherein the first wireless link or the second wireless link is selected to minimize energy utilization for wireless communications between the wireless node and the mobile device.

17. The method of claims 16, wherein an availability of a second state is dependent on the availability of the second wireless link.

18. The method of claim 1, further comprising:
identifying active applications on the mobile device;
running an application proxy for one or more of the identified active applications.

19. The method of claim 1, further comprising waking up the mobile device over at least one wireless link between the mobile device and the wireless node upon arrival of a significant event associated with a proxied application.

20. The method of claim 1, wherein the subset of applications associated with the mobile device comprises all applications associated with the mobile device.

21. The method of claim 1, wherein at least one wireless link between the mobile device and the wireless node is encrypted.

22. The method of claim 1 wherein the wireless node is a femto cell.

23. A communications apparatus, comprising:
a memory that retains instructions related to supporting communications for a mobile device with a wireless wide area network and providing application proxy support at the communications apparatus for a subset of applications running on the mobile device, wherein the instructions for providing application proxy support include instructions for transmitting a message to the mobile device instructing the mobile device to operate in a low energy consumption mode until a synchronization event occurs between the communications apparatus and the mobile device, wherein the instructions for providing application proxy support further include instructions for:
buffering a plurality of data sets, for respective different applications from the subset of applications running on the mobile device, from the wireless wide area network intended for the mobile device, and
each of the buffered plurality of data sets, causing the mobile device to wake-up after a corresponding delay associated with a respective one of the different applications from the subset of applications running on the mobile device that is based, at least in part, on delay tolerance and bandwidth requirements associated with the respective one of the different applications from the subset of applications running on the mobile device such that a first wakeup delay for a first application from the subset of applications running on the mobile device is different from a second wakeup delay for a second, different, application from the subset of applications running on the mobile device, transmitting the respective each of the buffered plurality of data sets to the awakened mobile device, and instructing the mobile device to transition to the low energy consumption mode after transmission of the each of the buffered plurality of data sets, and wherein the communications apparatus is accessible to the mobile device over a first wireless link; and
a processor, coupled to the memory, configured to execute the instructions retained in the memory.

24. The communications apparatus of claim 23, the memory retains further instructions related to receiving from the wireless wide area network a first subset of data intended for the mobile device, buffering the first subset of data for later transmission to the mobile device, and conveying the first subset of data to the mobile device over the first wireless link after an expiration of a delay associated with the first subset of data and with an application, running on the mobile device, to process the first subset of data.

25. The communications apparatus of claim 23, the memory retains further instructions related to maintaining at least two states for the subset of applications associated with the mobile device at the communications apparatus, wherein the instructions related to maintaining comprises instructions related to reserving a first state for at least one interaction between the communications apparatus and the wireless wide area network and reserving a second state for at least one interaction between the communications apparatus and the mobile device.

26. The communications apparatus of claim 23, the memory retains further instructions related to identifying active applications on the mobile device, operating an application proxy for one or more of the active applications, buffering data associated with each active application, and delivering the buffered data to the mobile device after expiration of a configurable delay.

27. A communications apparatus that provides proxy support for a mobile device, comprising:
means for supporting communications for the mobile device with a wireless wide area network; and
means for providing application proxy support at the communications apparatus for a subset of applications running on the mobile device, wherein the means for providing application proxy support include means for transmitting a message to the mobile device instructing the mobile device to operate in a low energy consumption mode until a synchronization event occurs between the wireless node and the mobile device, and wherein the means for providing application proxy support further include:

means for buffering a plurality of data sets, for respective different applications from the subset of applications running on the mobile device, from the wireless wide area network intended for the mobile device, and means for performing operations, for each of the buffered plurality of data sets, comprising causing the mobile device to wake-up after a corresponding delay associated with a respective one of the different applications from the subset of applications running on the mobile device that is based, at least in part, on delay tolerance and bandwidth requirements associated with the respective one of the different applications from the subset of applications running on the mobile device such that a first wakeup delay for a first application from the subset of applications running on the mobile device is different from a second wakeup delay for a second, different, application from the subset of applications running on the mobile device, transmitting the respective each of the buffered plurality of data sets to the awakened mobile device, and instructing the mobile device to transition to the low energy consumption mode after transmission of the each of the buffered plurality of data sets.

28. The communications apparatus of claim 27, wherein the means for providing comprises:

means for receiving from the wireless wide area network a first subset of data intended for the mobile device; and means for processing the first subset of data.

29. The communications apparatus of claim 27, further comprising:

means for buffering a first subset of data for later transmission to the mobile device; and means for conveying the first subset of data to the mobile device over a first wireless link after an expiration of a delay associated with the first subset of data and with an application, running on the mobile device, to process the first subset of data.

30. The communications apparatus of claim 29, further comprising means for maintaining at least two states for the subset of applications associated with the mobile device at the communications apparatus, wherein the means for maintaining comprises means for reserving a first state for at least one interaction between the communications apparatus and the wireless wide area network and means for reserving a second state for at least one interaction between the communications apparatus and the mobile device.

31. The communications apparatus of claim 27, further comprising:

means for receiving a second subset of data;
means for buffering the second subset of data; and
means for transmitting the second subset of data at substantially the same time as a first subset of data.

32. The communications apparatus of claim 27, further comprising:

means for identifying active applications on the mobile device;
means for running an application proxy for at least one of the active applications to buffer data; and
means for delivering the buffered data to the mobile device based on a configurable delay.

33. A computer program product, comprising:

a non-transitory computer-readable medium comprising:

a first set of codes for causing a computer to support communications for a mobile device with a wireless wide area network; and a second set of codes for causing the computer to provide application proxy support for a subset of applications running on the mobile device the mobile device, wherein the second set of codes for causing the computer to provide application proxy support includes a set of codes for causing the computer to transmit a message to the mobile device instructing the mobile device to operate in a low energy consumption mode until a synchronization event occurs between the computer and the mobile device, and wherein the second set of codes for causing the computer to provide application proxy support further includes another set of codes for causing the computer to:

buffer a plurality of data sets, for respective different applications from the subset of applications running on the mobile device, from the wireless wide area network intended for the mobile device, and for each of the buffered plurality of data sets, cause the mobile device to wake-up after a corresponding delay associated with a respective one of the different applications from the subset of applications running on the mobile device that is based, at least in part, on delay tolerance and bandwidth requirements associated with the respective one of the different applications from the subset of applications running on the mobile device such that a first wakeup delay for a first application from the subset of applications running on the mobile device is different from a second wakeup delay for a second, different, application from the subset of applications running on the mobile device, transmit the respective each of the buffered plurality of data sets to the awakened mobile device, and instruct the mobile device to transition to the low energy consumption mode after transmission of the each of the buffered plurality of data sets.

34. The computer program product of claim 33, the computer-readable medium further comprising:

a third set of codes for causing the computer to receive from the wireless wide area network a first subset of data intended for the mobile device;

a fourth set of codes for causing the computer to buffer the first subset of data for later transmission to the mobile device; and a fifth set of codes for causing the computer to convey the first subset of data to the mobile device over a first wireless link after expiration of a delay associated with the first subset of data and with an application, running on the mobile device, to process the first subset of data.

35. At least one processor configured to provide proxy support for a mobile device, comprising:

a first module that supports communications for the mobile device with a wireless wide area network;

a second module that provides application proxy support for a subset of applications running on the mobile device, wherein the second module is further configured to instruct the first module to transmit a message to the mobile device instructing the mobile device to operate in a low energy consumption mode until a synchronization event with the mobile device, and wherein the second module is further configured to:

buffer a plurality of data sets, for respective different applications from the subset of applications running on the mobile device, from the wireless wide area network intended for the mobile device, and for each of the buffered plurality of data sets, cause the mobile device to wake-up after a corresponding delay associated with a respective one of the different applications from the subset of applications running on the mobile device that is based, at least in part, on delay tolerance and bandwidth requirements associated with the respective one of the different applications from the subset of applications running on the mobile device such that a first wakeup delay for a first application from the subset of applications running on the mobile device is different from a second wakeup delay for a second, different, application from the subset of applications running on the mobile device, transmit the respective each of the buffered plurality of data sets to the awakened mobile device, and instruct the mobile device to transition to the low energy consumption mode after transmission of the each of the buffered plurality of data sets;

a third module that receives from the wireless wide area network a first subset of data intended for the mobile device; and a fourth module that processes the first subset of data.

36. The at least one processor of claim 35, further comprising:

a fifth module that buffers the first subset of data for later transmission to the mobile device; and a sixth module that conveys the first subset of data to the mobile device over a first wireless link after expiration of a delay associated with the first subset of data and with an application, running on the mobile device, to process the first subset of data, wherein the delay is dynamically configurable.

37. A mobile device comprising:

one or more processors; and storage media comprising computer instructions that, when executed on the one or more processors, cause operations comprising:

communicating with a communication apparatus configured to support communications for the mobile device with a wireless wide area network; and receiving a plurality of data sets from the communication apparatus;

wherein the communication apparatus is further configured to provide application proxy support at the communication apparatus for a subset of applications running on the mobile device the mobile device, wherein the communication apparatus configured to provide the application proxy support is configured to transmit a message to the mobile device instructing the mobile device to operate in a low energy consumption mode until a synchronization event occurs between the communications apparatus and the mobile device, and wherein the communication apparatus configured to provide the application proxy support is further configured to:

buffer the plurality of data sets, for respective different applications from the subset of applications running on the mobile device, from the wireless wide area network intended for the mobile device; and for each of the buffered plurality of data sets, causing the mobile device to wake-up after a corresponding delay associated with a respective one of the different applications from the subset of applications running on the mobile device that is based, at least in part, on delay tolerance and bandwidth requirements associated with the respective one of the different applications from the subset of applications running on the mobile device such that a first wakeup delay for a first application from the subset of applications running on the mobile device is different from a second wakeup delay for a second, different, application from the subset of applications running on the mobile device, transmitting the respective each of the buffered plurality of data sets to the awakened mobile device, and instructing the mobile device to transition to the low energy consumption mode after transmission of the each of the buffered plurality of data sets, the communications apparatus being accessible to the mobile device over a first wireless link.

38. The mobile device of claim 37, wherein the communication apparatus is further configured to:

receive from the wireless wide area network a first subset of data intended for the mobile device, buffer the first subset of data for later transmission to the mobile device, and convey the first subset of data to the mobile device over the first wireless link after an expiration of a delay associated with the first subset of data and with an application, running on the mobile device, to process the first subset of data.

39. The mobile device of claim 37, wherein the communication apparatus is further configured to:

maintain at least two states for the subset of applications associated with the mobile device at the communications apparatus, wherein the communication apparatus configured to maintain is configured to reserve a first state for at least one interaction between the communications apparatus and the wireless wide area network, and reserve a second state for at least one interaction between the communications apparatus and the mobile device.

40. The mobile device of claim 37, wherein the communication apparatus is further configured to:

identify active applications on the mobile device, operate an application proxy for one or more of the active applications, buffer data associated with each active application, and deliver the buffered data to the mobile device after expiration of a configurable delay.

* * * * *